United States Patent
Falk et al.

(10) Patent No.: US 11,930,071 B2
(45) Date of Patent: Mar. 12, 2024

(54) NETWORK ADAPTER FOR UNIDIRECTIONAL TRANSFER OF DATA

(71) Applicant: Siemens Aktiengesellschaft, Munich (DE)

(72) Inventors: Rainer Falk, Poing (DE); Stefan Seltzsam, Aying (DE); Hermann Seuschek, Munich (DE); Martin Wimmer, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/629,713

(22) PCT Filed: Jul. 24, 2020

(86) PCT No.: PCT/EP2020/070970
§ 371 (c)(1),
(2) Date: Jan. 24, 2022

(87) PCT Pub. No.: WO2021/018776
PCT Pub. Date: Feb. 4, 2021

(65) Prior Publication Data
US 2022/0279038 A1 Sep. 1, 2022

(30) Foreign Application Priority Data
Jul. 31, 2019 (EP) .................................... 19189375

(51) Int. Cl.
*H04L 67/10* (2022.01)
(52) U.S. Cl.
CPC .................. *H04L 67/10* (2013.01)
(58) Field of Classification Search
CPC .......... H04L 67/10; H04L 67/12; H04L 12/66
(Continued)

(56) References Cited

U.S. PATENT DOCUMENTS

| 7,042,893 B1 * | 5/2006 | Lo .......................... H04J 3/0697 370/503 |
| 2016/0094369 A1 * | 3/2016 | Chuyen ................... H04L 25/20 370/293 |

(Continued)

FOREIGN PATENT DOCUMENTS

| CN | 108490251 A | * | 9/2018 | ............. G01R 22/10 |
| DE | 102015108109 A1 | | 11/2016 | |

(Continued)

OTHER PUBLICATIONS

Anonymous: "Media-independent interface—Wikipedia"; Jul. 3, 2019; Item No. 2 in Section of "Non-Patent Literature Document" in IDS filed on Jan. 24, 2022 (Year: 2019).*

(Continued)

*Primary Examiner* — Ruolei Zong
(74) *Attorney, Agent, or Firm* — Schmeiser, Olsen & Watts LLP

(57) ABSTRACT

Provided is a network adapter for unidirectional transmission of a user data stream to a bidirectional network interface, the network adapter including: a first connection unit which is physically connected to a bidirectional network interface of a first device; a second connection unit which is physically connected to a bidirectional network interface of a second device; and a terminating unit which has at least one bit transmission module and which is designed to establish a bidirectional data link to the network interface of the first device, to receive the user data stream from the first device exclusively in a unidirectional fashion via the data link, and not to send a user data stream to the first device.

8 Claims, 3 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 2016/0204851 | A1* | 7/2016 | Li | ...................... H04B 7/18515 370/316 |
| 2017/0353368 | A1 | 12/2017 | Uwe et al. | |
| 2020/0336808 | A1* | 10/2020 | Menoher | ................. H04L 63/10 |

FOREIGN PATENT DOCUMENTS

| | | | |
|---|---|---|---|
| DE | 102017114441 | A1 | 8/2018 |
| DE | 102017219597 | A1 | 11/2018 |
| EP | 3207683 | A1 | 8/2017 |
| WO | 2019040438 | A1 | 2/2019 |

OTHER PUBLICATIONS

PCT International Search Report and Written Opinion of International Searching Authority dated Oct. 29, 2020 corresponding to PCT International Application No. PCT/EP2020/070970 filed Jul. 24, 2020.

Anonymous: "Media-independent interface—Wikipedia"; Jul. 3, 2020 (Jul. 3, 2020); XP055740847; Gefunden im Internet: URL:https://en.wikipedia.org/w/index.php?title=Mediaindependent_interface&oldid=904652696.

* cited by examiner

NETWORK ADAPTER FOR UNIDIRECTIONAL TRANSFER OF DATA

CROSS-REFERENCE TO RELATED APPLICATIONS

This application claims priority to PCT Application No. PCT/EP2020/070970, having a filing date of Jul. 24, 2020, which is based off of EP Application No. 19189375.9, having a filing date of Jul. 31, 2019, the entire contents both of which are hereby incorporated by reference.

FIELD OF TECHNOLOGY

The following relates to a network adapter for unidirectional transfer of a data stream to a bidirectional network interface.

BACKGROUND

Present-day industrial installations, traffic safety networks or power distribution networks comprise a multiplicity of devices which exchange data, for example about the state of the device or diagnostic data, with one another via a communication network or transfer said data to central control or monitoring servers. Such devices are often referred to as Internet-of-Things devices, IoT devices for short. Data, for example from industrial installations, are intended to be transferred for analysis purposes in a protected manner to an Internet-of-Things server situated either close to the industrial installation or in a remote, jointly used server system, also referred to as cloud. The data can be evaluated there for example in order to identify future defects in a timely manner, in order to optimize machine parameters or in order to identify attacks or manipulations of the industrial installation. For cost reasons, a public network, for example the internet, or an office network or factory network is generally used here for the data transfer.

An important security requirement is that for example an automation network cannot be attacked or influenced from outside, for example from the internet. This is important particularly since some automation networks have to satisfy specific real-time and operational security requirements. Moreover, in some automation networks, old devices having inadequate access protection are in use and operational security is often realized by way of strict network isolation, also referred to as perimeter protection. This means that it is not possible for devices to be directly linked bidirectionally to external systems since that jeopardizes the protection level of the installation networks.

Data diodes or one-way gateways are known which enable an installation network to be linked to an external or public network in a manner free of feedback. Such a one-way gateway ensures that data can only be transferred from the industrial installation, which constitutes a network zone with high security relevance. A transfer of data from the external network, which constitutes a network zone with possibly lower security relevance, into the installation network is not directly possible, nor should it be possible to introduce data from signaling protocols or other data sources from the external network into the installation network. This strict data flow control reliably prevents the operation of the industrial installation from being able to be influenced or adversely affected from an external network.

WO 2019/040438 A1 discloses a hardware-enforced information flow control device having a first and a second network interface card connected to the transmitting end and receiving end, respectively. The first network interface card comprises two transceiver modules connected to one another. The transmission output of a transceiver module of the first network interface card is additionally connected to a transceiver module of the second network interface card. The information flow is transferred between the first and second network interface cards via this connection.

DE 10 2015 108109 A1 discloses a device for unidirectional data transfer from a transmitter in a first network via a data diode to a receiver in a second network.

One-way gateways currently offered are, depending on the field of use, expensive network components that are usually derived from components for military or official use. The high costs prevent desirable broad use in industrial networks. EP 3207683 describes for example such a method and such a device for feedback-free acquisition of data in a security-critical network zone and transfer of the data into a network zone with a low security requirement.

SUMMARY

Furthermore, there is a need to extend existing network components, such as data gateways to cloud servers, for example, by a one-way transfer functionality.

Consequently, an aspect relates to enable a secure, strictly unidirectional data transfer from a security-critical, for example closed, network zone to a public network zone, to a network zone with lower security relevance, for example to a cloud server system, using the simplest and most cost-effective means possible. In this case, the intention is to be able to continue to use existing network components and nevertheless to ensure one-way communication with as little outlay as possible.

In accordance with a first aspect, embodiments of the invention relate to a network adapter for unidirectional transfer of a payload data stream to a bidirectional network interface, comprising a first connection unit, which is physically connectable to a bidirectional network interface of a first device, a second connection unit, which is physically connectable to a bidirectional network interface of a second device, and a terminating unit comprising at least one bit transfer assembly and configured in such a way as to establish a bidirectional data connection to the network interface of the first device, to receive the payload data stream from the first device exclusively unidirectionally via the data connection, and not to transmit payload data to the first device.

The bidirectional data connection to the network interface of the first device can be in particular a bidirectional physical layer link, e.g. Ethernet PHY. It is established bidirectionally, such that the first device identifies an established bidirectional connection and can thereby activate the latter. Even though the first device identifies a bidirectional data connection, nevertheless only a unidirectional transfer of payload data is possible, however.

The network adapter provides a cost-effective and technically minimalistic realization of a one-way gateway in which freedom from feedback to the connected first device is ensured by virtue of the fact that the bidirectional data connection exclusively receives the payload data stream from the first device, but does not transmit a payload data stream to the first device. In this case, the freedom from feedback is enforced by hardware measures. The network adapter can be used with an arbitrary first device arranged in the security-relevant network zone and comprising a conventional bidirectional network interface. Consequently, data can be communicated from the first device in a security-critical network zone to a second device arranged in a zone with lower security relevance. In this case, the two connected network interfaces of the first and second devices are given the feigned impression that a conventional bidirectional data connection physically exists. Otherwise, these network interfaces would identify a fault or they would not recognize that a transfer medium, for example a network cable, is connected. The terminating unit specifically comprises a bit transfer assembly for this purpose, which bit transfer assembly terminates a bidirectional network interface at the physical level, i.e. can establish a conventional bidirectional connection with the bidirectional network interface of the for example first device. Nevertheless, data packets can only be transferred unidirectionally. In this case, terminating at the physical level denotes carrying out tasks and exchanging information according to a first layer, also referred to as physical layer, of an open systems interconnection model standardized by the International Telecommunications Union ITU-T, said model being referred to as OSI reference model for short.

In the network adapter according to embodiments of the invention, the terminating unit comprises a first bit transfer assembly, which terminates the bidirectional data connection in relation to a bit transfer mode and comprises a media-dependent interface and a media-independent interface.

The first bit transfer assembly can be configured in such a way that either the media-dependent interface or the media-independent interface is used for the unidirectional data transfer. The bit transfer assembly can be connected differently at its interfaces for transfer of the payload data stream and thus affords a possibility of intervention affecting the transfer direction of the data connection. The bit transfer assembly is embodied as an integrated circuit.

In an embodiment that is not according to embodiments of the invention, only the media-dependent interface in a first bit transfer assembly is connected up and the media-dependent interface is configured in such a way as to terminate the data connection according to a predefined type of a transfer medium of the bidirectional data connection.

This has the advantage that the network adapter is available in a preconfigured manner for the predefined type of a transfer medium of the bidirectional data connection and is functional without further configuration.

In an embodiment that is not according to embodiments of the invention, the media-independent interface of the first bit transfer assembly is not connected up.

Consequently, the data connection is terminated at this location and no data can be transmitted from the bit transfer assembly to the first device. In particular, on the media-dependent interface the properties of the data connection according to the remote station and the type of the connected transfer medium are agreed by means of signals exchanged between the bit transfer assembly in the network adapter and the first network interface in the first device. It is ensured that the connection between the network adapter and the first device has freedom from feedback.

In an embodiment that is not according to embodiments of the invention, the payload data stream is coupled out between the first connection unit and the terminating unit and is output to the second connection unit.

In this case, coupling out the payload data stream denotes passively transferring or reading out the payload data stream from an area of the data connection within the network adapter. The payload data stream is duplicated, for example, and the duplicated payload data stream is communicated to the network interface of the second device. The network interface in the first device and also the network interface of the bit transfer assembly are configured in the so-called "promiscuous mode". The original payload data stream is passed on to the bit transfer assembly and is terminated there. The bit transfer assembly thus terminates the data connection in the network adapter.

In the network adapter according to embodiments of the invention, the terminating unit comprises the first and a second bit transfer assembly, wherein the first bit transfer assembly communicates the payload data stream unidirectionally to the second bit transfer assembly and the second bit transfer assembly terminates a second data connection to the second device.

This has the advantage that the data stream is actively forwarded and a selection of usable types of transfer media is thus greater. Two active network connections are thus established, firstly from the first bit transfer assembly to the network interface in the first device and also a second active data connection from the second bit transfer assembly to the network interface of the second device.

In the network adapter according to embodiments of the invention, the first bit transfer assembly communicates the payload data stream to the second bit transfer assembly via a media-independent interface.

Consequently, the payload data stream is communicated only from the first to the second bit transfer assembly. In the return direction, from the second to the first bit transfer assembly, no transfer of the payload data stream takes place.

In one advantageous embodiment, the first bit transfer assembly agrees a type of the transfer medium of the bidirectional data connection with the first device.

This has the advantage that it is possible to use different types of transfer media between the first device and the network adapter, in particular the first connection unit.

In one advantageous embodiment, the second bit transfer assembly agrees a type of a transfer medium of the bidirectional data connection with the second device, and forwards the payload data stream received in the second bit transfer assembly to the second device.

This has the advantage that it is possible to use different types of transfer media between the network adapter and the second device.

In one advantageous embodiment, the second bit transfer assembly is configured in such a way as to receive the payload data stream from the first bit transfer assembly on the media-independent interface and to communicate the payload data stream from the media-independent interface to the network interface of the second device, in a promiscuous mode.

This has the advantage that payload data stream is only transferred unidirectionally via the media-independent interface. The media-dependent interface of the first bit transfer assembly and that of the second bit transfer assembly are not connected and are thus decoupled and no payload data stream can be communicated between the first and second bit transfer assemblies on media-dependent interfaces.

In one advantageous embodiment, the network adapter comprises a media control unit, which configures the first and/or the second bit transfer assembly for providing the predefined or agreed type of the transfer medium.

The bit transfer assembly can thus be set up in a simply structured manner since the media control unit implements logic for setting and adaptation to the different types of transfer media.

In one advantageous embodiment, the first and second connection units are embodied as plug connectors for the connection of a transfer medium. The plug connector can be a plug, a plug adapter, or a plug adapter cable.

The network adapter can thus be connected to an existing transfer medium in a simple manner. Such a plug connector can be embodied as an Ethernet socket according to RJ-45 or M12 standard or IEC 63171-2 (single pair Ethernet for office environment) or IEC 63171-5 (single pair Ethernet for industrial environment), for example, and can receive a corresponding Ethernet cable or the plug thereof.

In one advantageous embodiment, the network adapter comprises two transfer media which are fixedly connected to the first and/or the second connection unit.

Combinations of network adapter plus transfer medium can thus be fixedly preconfigured and thus be connected to devices without additional transfer media.

In one advantageous embodiment, the first and/or second bit transfer assembly terminate(s) the bidirectional data connection in relation to the bit transfer mode according to an Ethernet standard.

The Ethernet standard, standardized with the number 802.3 by the standardization body IEEE, is widely used in network technology. A corresponding network adapter thus covers a wide field of use.

The respective "unit" can be implemented in terms of hardware technology and/or else in terms of software technology. In the case of an implementation in terms of hardware technology, the respective unit can be embodied as a device or as part of a device. The network adapter and the units contained, in particular the terminating unit, can be embodied as integrated circuits, as microprocessors or as programmable circuit components. In the case of an implementation in terms of software technology, the respective unit can be embodied as a computer program product (non-transitory computer readable storage medium having instructions, which when executed by a processor, perform actions), as a function, as a routine, as part of a program code or as an executable object.

BRIEF DESCRIPTION

Some of the embodiments will be described in detail, with reference to the following figures, wherein like designations denote like members, wherein.

DETAILED DESCRIPTION

Mutually corresponding parts are provided with the same reference signs in all of the figures.

Figure 1:
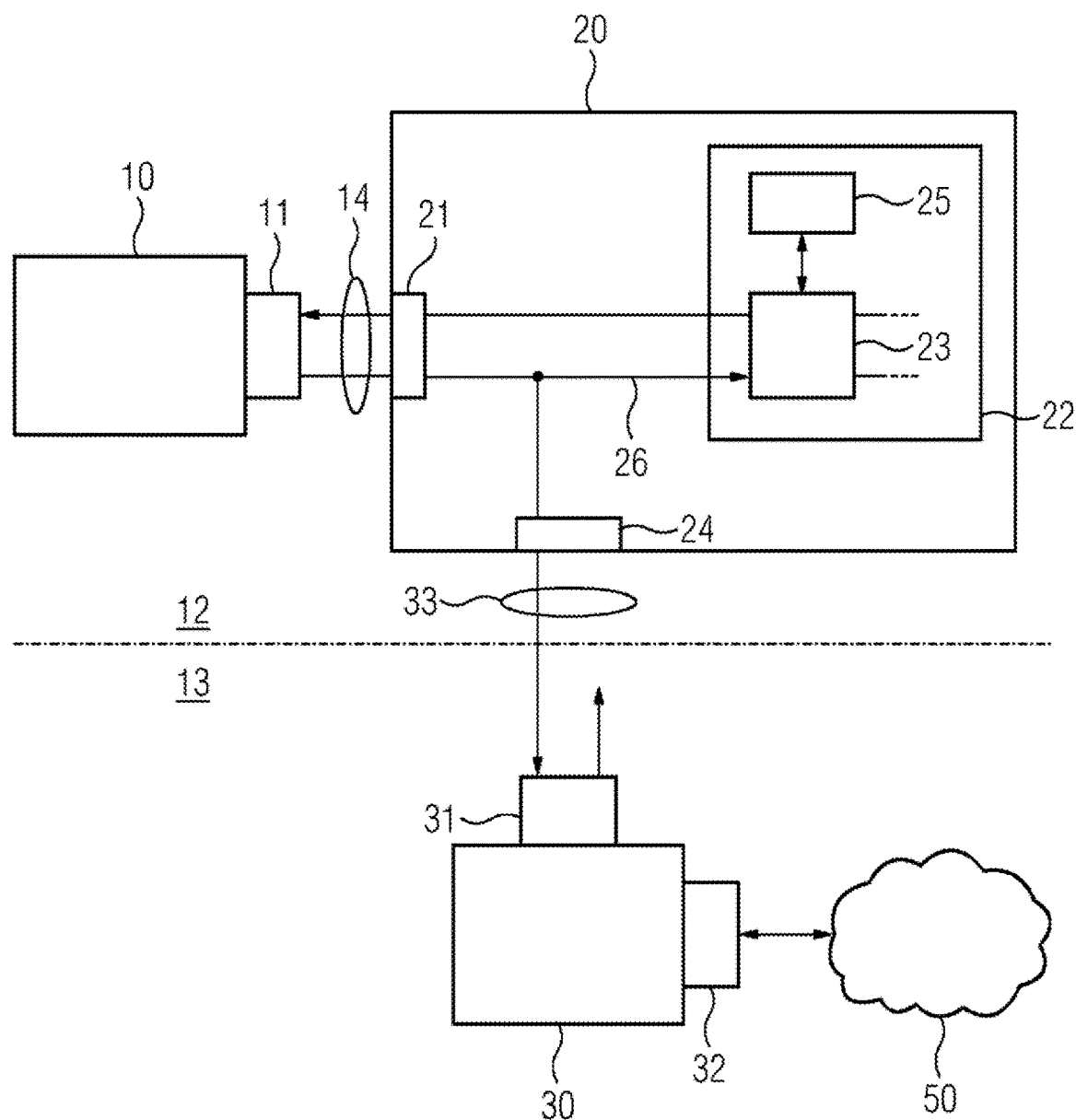
FIG. 1 shows a first exemplary embodiment of a network adapter that is not according to the invention with a passive tapping of the payload data stream in a block illustration.

FIG. 1 shows a network adapter 20 comprising a first connection unit 21, which is physically connectable to a bidirectional network interface 11 of a first device 10. The network adapter 20 furthermore comprises a second connection unit 24, which is physically connectable to a second bidirectional network interface 31 of a second device 30. The first device 10 is arranged in a security-relevant network zone 12. The first connection unit 21 thus forms an interface to the security-relevant network zone, for example a data network of an automation installation or an operational security network. The second device 30 is situated in a network zone 13 with low security relevance, for example an office network or a public network, for example the internet. The second device 30 can be connected to a server 50, in particular a cloud system, by a further network interface 32.

The network adapter 20 furthermore comprises a terminating unit 22 configured in such a way as to establish a bidirectional data connection 14 to the network interface 11 of the first device 10. The data connection 14 is realized for example via a network cable connected to the first connection unit 21 and to the network interface 11 of the first device 10. A data connection 33 is relayed via the second connection unit 24 to the bidirectional network interface of the second device 30.

The terminating unit 22 comprises a first bit transfer assembly 23, which terminates the bidirectional data connection 14 in relation to a bit transfer mode. An active data connection 14 is thus established between the first bidirectional network interface 11 and the bit transfer assembly 23. The bit transfer mode comprises functions on a physical layer in accordance with an OSI reference model. These functions are defined according to the connected transfer medium. For network cables according to the Ethernet standard, the corresponding functions are defined in standard 802.3 from the Institute for Electrical and Electronic Engineers IEEE. However, the network adapter 20 is not restricted to transfer media according to the Ethernet standard, i.e. Ethernet cables. Other transfer media according to other standards are also connectable to the first and second connection units 21, 24.

The bit transfer assembly 23 comprises a media-independent interface and also a media-dependent interface. Via the media-independent interface, for example, the physical encoding of the data to be transferred, for example the clock frequency and encoding methods, is agreed with the opposite network interface, here network interface 11 of the first device. The media-dependent interface forms the mechanical connection of the bit transfer assembly and is connected to the first connection unit 21.

In the present embodiment, the data connection 14 is connected from the first bidirectional network interface 11 of the first device via the first connection unit 21 to the bit transfer assembly 23 of the terminating unit 22 and is terminated there. The media-independent interface of the bit transfer assembly 23 is not connected up in this case. Consequently, no payload data stream can be communicated from the bit transfer assembly 23 to the first device. The bit transfer assembly 23 is fixedly configured to a type of a connected transfer medium via which the data connection 14 is physically transferred. In this regard, the bit transfer assembly 23 is configured for example in such a way as to establish a data connection according to a 10-Mbit or 100-Mbit transfer medium in accordance with the Ethernet standard. The configuration of the bit transfer assembly 23 is effected by way of a media control unit 25, for example. Alternatively, the bit transfer assembly 23 can be fixedly configured to a type of the transfer medium and thus only support a corresponding transfer medium. In this case, the network interface 31 of the second device 30 is operated in the promiscuous mode.

The payload data stream is then coupled out unidirectionally between the first connection unit 21 and the first bit transfer assembly 23 by means of the data connection 14 and is passed on via the second connection unit 31 to the bidirectional network interface 31 of the second device 30. The second device 30 can forward the data or the payload data stream to the server 50 via the second network interface 32, for example. The network adapter 20 can terminate in particular a data connection 14 via transfer media in accordance with the Ethernet standard with a transfer rate of 10 Mbits/s or 100 Mbits/s.

Figure 2:
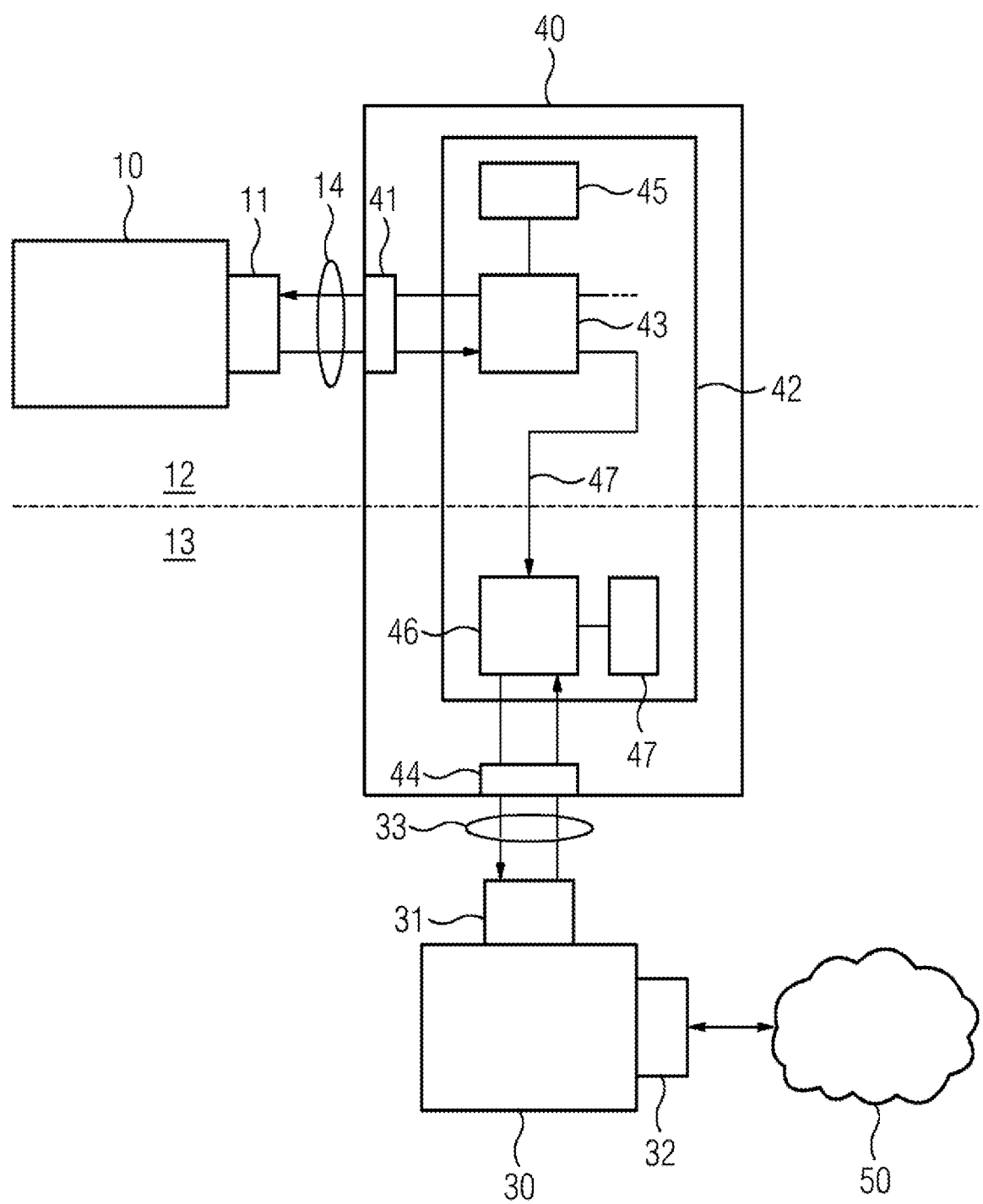
FIG. 2 shows a second exemplary embodiment of the network adapter according to the invention with an active tapping of the payload data stream in a block illustration.

FIG. 2 shows an active tapping of the payload data stream from the data connection 14. In this case, the network adapter 40 comprises a first connection unit 41 and also a second connection unit 44, which are respectively connectable to the bidirectional network interface 11, 31 of the first device 10 and of the second device 30, respectively. A first bit transfer assembly 43 is arranged in the terminating unit 42 and maintains and terminates an active bidirectional data connection 14 to the first network interface 11 of the first device 10. In this case, the first device 10 is the transmitter of the payload data stream. The payload data stream is received via the media-dependent interface in the bit transfer assembly 43.

The terminating unit 42 furthermore comprises a second bit transfer assembly 46, which is connected via a unidirectional data connection 47 to the media-independent interface of the first bit transfer assembly 43. The payload data stream is forwarded from the first bit transfer assembly 43 via said unidirectional data connection 47 to the media-independent interface of the second bit transfer assembly 46. In this case, the media-independent interface of the first bit transfer assembly is connected such that data are only transferred in one direction to the second bit transfer assembly 46. This ensures that data can only be routed out of the security-critical network zone 12, but no data can be introduced into the security-critical network 12.

The first and second bit transfer assemblies 43, 46 are connected to a respective media control unit 45, 47, which configures the respective bit transfer assembly 43, 46. The media control unit 45, 47 can also be embodied as a single media control unit, which configures both the first and the second bit transfer assembly 43, 46.

Between the second bit transfer assembly 46 and further via the second connection unit 44 there is a bidirectional data connection 33 to the network interface 31 of the second device 30, which is a receiver of the data connection or of the payload data stream. The bidirectional network interface 31 of the second device 30 is advantageously operated in the promiscuous mode. The payload data stream received from the second bit transfer assembly 46 is communicated in the second data connection 33 via the second connection unit 44 to the network interface 31 of the second device 30. The second device 30 comprises a cloud gateway, for example, and transfers the optionally conditioned or filtered payload data stream to the cloud system 50.

Figure 3:
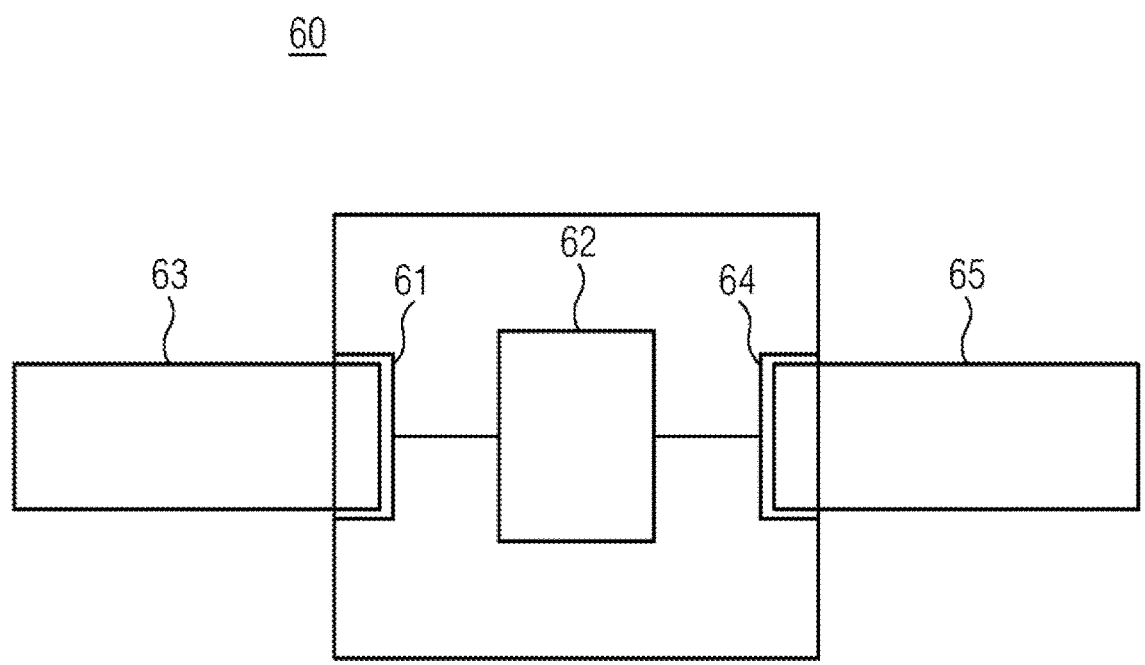
FIG. 3 shows a third exemplary embodiment of the network adapter according to the invention with transfer media in a block illustration.

FIG. 3 shows a network adapter 60 comprising a terminating unit 62 and also a first and a second connection unit 61, 64 and also two transfer media 63, 65. The first and/or second connection unit 61, 64 of the network adapter 60 is embodied for example as a plug connector for the connection of a transfer medium 63, 65. The transfer media 63, 65 are releasably connectable to a respective connection unit.

The network adapter 60 can alternatively comprise one or two transfer media 63, 65. In this case, said one and/or second transfer medium/media 63, 65 are/is fixedly connected to the first and/or second connection unit 61, 64, respectively. The transfer media 63, 65 are Ethernet cables, for example. Furthermore, it is possible for only one connection unit to be embodied as a plug connector; the other connection unit can be fixedly connected to a transfer medium.

In comparison with the previously known unidirectional data transfer devices such as a unidirectional gateway, for example, the hardware outlay is drastically reduced in the case of the present network adapter. The different configuration possibilities enable different transfer media to be supported, in particular transfer media according to the Ethernet standard IEEE 802.3. The network adapter according to embodiments of the invention enables the costs for an industrial data diode to be considerably reduced. The network adapter can be used with existing devices, so-called brown field devices, and also with new devices.

The variant described and illustrated in FIG. 1 supports a purely passive tapping of data. It thus enables the cost-effective realization both as a feedback-free network tap and as a unidirectional gateway, i.e. as a data diode for critical infrastructures.

The second variant of the network adapter as described in FIG. 2 furthermore supports data connections via transfer media with a transfer rate of 1 Gbit/s. Since the data are tapped actively, this solution is not feedback-free in the physical sense. However, this variant is very well suited to the cost-effective realization of a unidirectional gateway with dedicated additional transmitter and receiver systems. Even in the case of a drop in performance of the gateway link, the solution is free of feedback from the standpoint of the critical network.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A network adapter for unidirectional transfer of a payload data stream to a bidirectional network interface, comprising a first connection unit, which is physically connectable to a bidirectional network interface of a first device;

a second connection unit, which is physically connectable to a bidirectional network interface of a second device; and a terminating unit comprising at least one bit transfer assembly and configured in such a way as to establish a bidirectional data connection to the network interface of the first device, to receive the payload data stream from the first device exclusively unidirectionally via the data connection, and not to transmit a payload data stream to the first device;

wherein the terminating unit comprises a first bit transfer assembly, which terminates the bidirectional data connection in relation to a bit transfer mode and comprises a media-dependent interface and a media-independent interface, the media-dependent interface forming a mechanical connection of the first bit transfer assembly to the first connection unit;

wherein the terminating unit further comprises a second bit transfer assembly, which is connected via a unidirectional data connection to the media-independent interface of the first bit transfer assembly;

wherein the first bit transfer assembly communicates the payload data stream unidirectionally to the second bit transfer assembly via the unidirectional data connection to a media-independent interface of the second bit transfer assembly, and the second bit transfer assembly terminates a second data connection to the second device.

2. The network adapter as claimed in claim 1, wherein the first bit transfer assembly agrees a type of a transfer medium of the bidirectional data connection with the first device.

3. The network adapter as claimed in claim 1, wherein the second bit transfer assembly agrees a type of a transfer medium of the bidirectional data connection with the second device, and forwards the payload data stream received in the second bit transfer assembly to the second device.

4. The network adapter as claimed in claim 1, wherein the second bit transfer assembly is configured in such a way as to receive the payload data stream from the first bit transfer assembly on the media-independent interface and to communicate the payload data stream from the media-independent interface to the network interface of the second device in a promiscuous mode.

5. The network adapter as claimed in claim 1 comprising a media control unit, which configures the first bit transfer assembly and the second bit transfer assembly for providing the predefined or agreed type of the transfer medium.

6. The network adapter as claimed in claim 1, wherein the first and second connection units are embodied as plug connectors for the connection of a transfer medium.

7. The network adapter as claimed in claim 1, comprising at least one transfer medium, which is fixedly connected to the first connection unit and the second connection unit.

8. The network adapter as claimed in claim 1, wherein the first bit transfer assembly and second bit transfer assembly terminates the bidirectional data connection in relation to the bit transfer mode according to an Ethernet standard.

\* \* \* \* \*